(12) United States Patent
Kim

(10) Patent No.: US 11,503,799 B2
(45) Date of Patent: Nov. 22, 2022

(54) PET BOWL ASSISTANCE BAG

(71) Applicant: Deok-Han Kim, Cheongju-si (KR)

(72) Inventor: Deok-Han Kim, Cheongju-si (KR)

(*) Notice: Subject to any disclaimer, the term of this patent is extended or adjusted under 35 U.S.C. 154(b) by 353 days.

(21) Appl. No.: 16/867,563

(22) Filed: May 6, 2020

(65) Prior Publication Data

US 2020/0367468 A1  Nov. 26, 2020

(30) Foreign Application Priority Data

May 20, 2019 (KR) .................. 10-2019-0058565

(51) Int. Cl.
*A01K 5/01* (2006.01)
*A45C 3/00* (2006.01)
*A45C 9/00* (2006.01)

(52) U.S. Cl.
CPC .............. *A01K 5/0114* (2013.01); *A45C 3/00* (2013.01); *A45C 9/00* (2013.01)

(58) Field of Classification Search
CPC ...... A61K 5/0014; A61K 5/0114; A45C 3/00; A45C 9/00
USPC .................................. 119/61.5, 61.56, 61.57
See application file for complete search history.

(56) References Cited

U.S. PATENT DOCUMENTS

| | | | | |
|---|---|---|---|---|
| 4,065,195 A * | 12/1977 | Fahmie | ................ | A01K 5/0114 312/258 |
| 5,909,717 A * | 6/1999 | Randall | ................ | A01K 5/0114 119/58 |
| 7,077,074 B2 * | 7/2006 | Polimeni, Jr. | ........ | A01K 5/0114 119/61.56 |
| 7,124,709 B1 * | 10/2006 | Greer | ................... | A01K 5/0114 119/61.5 |
| 2008/0035066 A1 * | 2/2008 | Enriquez | .............. | A01K 5/0114 119/61.5 |
| 2016/0249584 A1 * | 9/2016 | Yibao | ...................... | A01K 5/00 119/61.5 |
| 2017/0303506 A1 * | 10/2017 | Wold | .................... | A01K 13/004 |
| 2019/0075898 A1 | 3/2019 | Friedgood | | |

FOREIGN PATENT DOCUMENTS

KR  10-1051960 B1  7/2011

* cited by examiner

*Primary Examiner* — Sue A Weaver

(74) *Attorney, Agent, or Firm* — Revolution IP, PLLC

(57) ABSTRACT

Disclosed is a pet bowl assistance bag including: a rear support frame formed in a rectangular shape having a predetermined size; a front support frame extending from a lower portion of the rear support frame and having a size corresponding to the rear support frame; a folding portion coupled to both side portions of the front support frame and the rear support frame, and folded such that the front support frame is opened by a predetermined distance from the rear support frame; and a bowl holder frame having one end coupled to an upper portion of the front support frame and an opposite end attached to an upper inner surface of the rear support frame, wherein an angle of the bowl holder frame is adjusted and fixed, so that the pet is conveniently fed and the portability is improved.

3 Claims, 7 Drawing Sheets

PET BOWL ASSISTANCE BAG

BACKGROUND OF THE INVENTION

1. Field of the Invention

The present invention relates to a pet bowl assistance bag, and more particularly, to an assistance bag having a frame for holding a pet bowl to assist the feeding of the pet.

2. Description of the Related Art

When staying at a place other than home, such as a camp or hotel, an owner basically prepares for food, snack, bowl, and bowl holder for a pet. However, since a conventional pet bowl holder is formed of plastic or wood, the bowl holder cannot be easily fit in a bag due to a large volume, thereby causing an inconvenience. In addition, the bowl holder is easily broken during transportation due to the material properties.

In most cases, a person taking care of the pet prepares for the bowl due to the above problems of the bowl holder. When the pet is fed with food or water at a traveling place, it is difficult to feed the pet due to a low height of the bowl placed on a floor, and the bowl is rarely fixed thereon. The above problems may be very sensitive and uncomfortable for the owner who regards the pet as a member of family.

SUMMARY OF THE INVENTION

The present invention provides an assistance bag for enabling a pet to be easily fed with food regardless of a location when an owner travels together with the pet. The present invention provides an assistance bag for adjusting an angle of a bowl based on a size of a pet and a feeding condition of the pet, and allowing a bowl holder to be easily carried therein or attached thereto. The pet bowl assistance bag according to the embodiments of the present invention includes: a rear support frame formed in a rectangular shape having a predetermined size; a front support frame extending from a lower portion of the rear support frame and having a size corresponding to the rear support frame; a folding portion coupled to both side portions of the front support frame and the rear support frame, and folded such that the front support frame is opened by a predetermined distance from the rear support frame; and a bowl holder frame having one end coupled to an upper portion of the front support frame and an opposite end attached to an upper inner surface of the rear support frame, wherein the bowl support frame is attached to any place on the upper inner surface of the rear support frame, so that an angle of the bowl holder frame is adjusted. According to the embodiments of the present invention, the pet bowl assistance bag is manufactured to have a structure to be opened and hold the bowl when the owner feeds a pet while traveling together with the pet, so that it is very convenient to carry the bag. In addition, it is formed of a solid material so that the bowl can be stably held and the durability can be improved.

According to the embodiments of the present invention, the pet bowl assistance bag is manufactured to allow an angle and a height of the bowl to be adjusted while the bowl assistance bag is opened during feeding the pet, so that the pet can be fed more comfortably. The pet bowl assistance bag according to the embodiments of the present invention may be manufactured to be attached to one side of an existing pet bag, carried independently, and fixed perpendicular to any structure, so that the feeding and the portability can be improved.

DETAILED DESCRIPTION OF THE INVENTION

Figure 1:
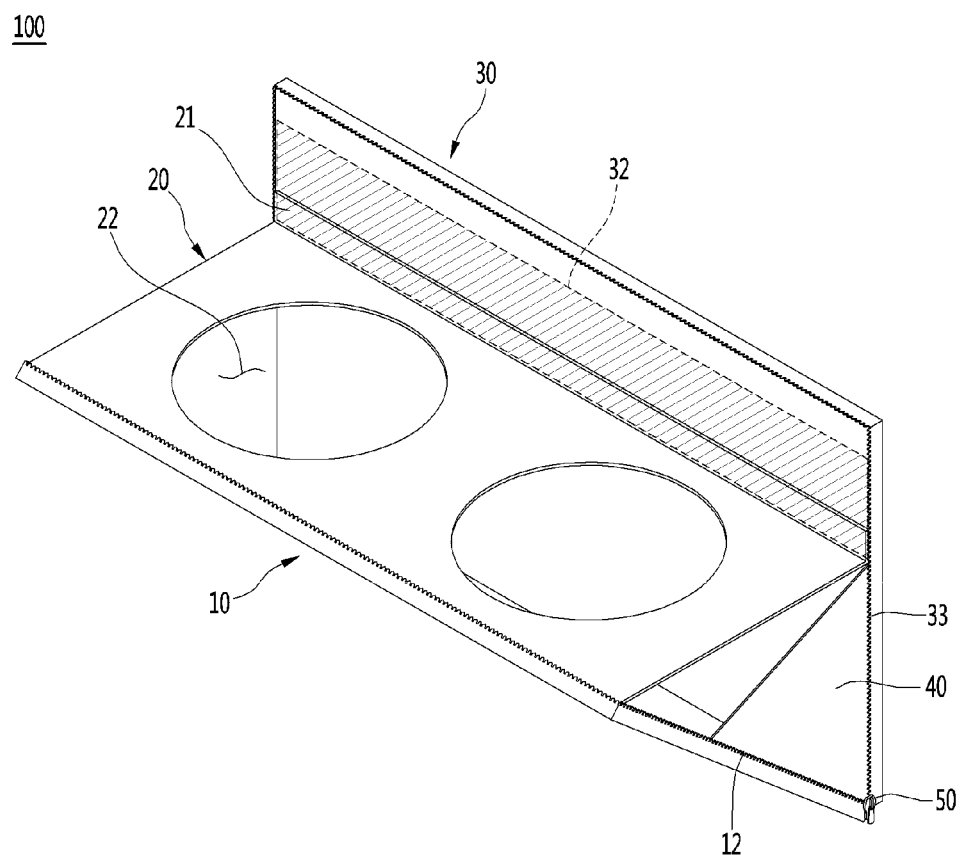
FIG. 1 is a perspective view in which a pet bowl assistance bag according to an embodiment of the present invention is opened.
Figure 2:
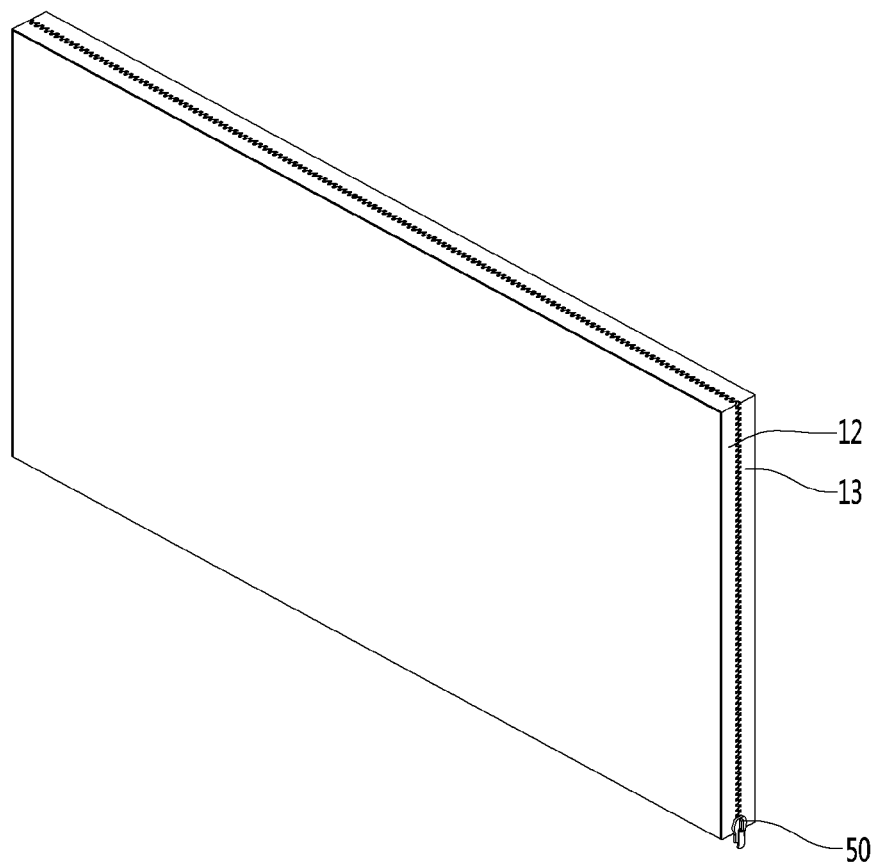
FIG. 2 is a perspective view in which the pet bowl assistance bag according to the embodiment of the present invention is closed.

FIG. 1 is a perspective view in which a pet bowl assistance bag according to an embodiment of the present invention is opened. FIG. 2 is a perspective view in which a pet bowl assistance bag according to the embodiment of the present invention is closed.

Referring to FIG. 1, a pet bowl assistance bag 100 according to the embodiment may include: a rear support frame 30 formed in a rectangular shape having a predetermined size; a front support frame 10 extending from a lower portion of the rear support frame 30 and having a size corresponding to the rear support frame 30; a folding portion 40 coupled to both side portions of the front support frame 10 and the rear support frame 30, and folded such that the front support frame 10 is opened by a predetermined distance from the rear support frame 30; and a bowl holder frame 20 having one end coupled to an upper portion of the front support frame 10 and an opposite end attached to an upper inner surface of the rear support frame 30. The rear support frame 30 and the front support frame 10 may have rectangular shapes having mutually the same sizes and having four edges, and may be formed in a pocket shape in which at least one edge is connected to each other and the remaining edges are coupled to or separated from each other.

In order to configure the above shapes, teeth 12 and 33, which are pathways through which a slide fastener (zipper) 50 moves, may be provided at both side portions and upper edges of the rear support frame 30 and the front support frame 10. The zipper 50 may open or close the front support frame 10 with respect to the rear support frame 30 while moving from one lower ends of the rear support frame 30 and the front support frame 10 to the other lower ends thereof. Zippers 50 may be provided at the both lower sides of the rear support frame 30 and the front support frame 10, respectively.

When the zipper 50 between the rear support frame 30 and the front support frame 10 is closed, a shape of a bag, such as a pouch, may be formed to provide a predetermined space therein.

One side of the bowl holder frame 20 may be coupled to an upper end edge portion of the front support frame 10, and two through-holes 22 may be formed in an inner area of the bowl holder frame 20 to mount at least two bowls therein. One of the two bowls may contain feed and the other may contain water. However, the present invention is not limited thereto, and the bowl holder frame 20 may be configured to mount one or at least two bowls if necessary.

Sizes of the rear support frame 30 and the front support frame 10 are determined depending on a size of the bowl holder frame 20. The drawings illustrate the case including two bowls.

In the embodiment, the bowl may have a cylindrical shape and be formed at an outer circumferential surface thereof with a step so as to be mounted and fixed to the through-hole 22. In addition, the through-hole 22 has a step such that an upper diameter is greater than a lower diameter thereof. The through-hole 22 corresponds to the diameter corresponding to the lower portion of the outer circumferential surface of the bowl having the step, so that a lower portion of the bowl is inserted into the through-hole 22. In addition, an upper portion of the bowl is supported on the upper surface of the through-hole 22, so that the bowl may be stably fixed in a state in which the bowl is mounted on the through-hole 22.

As described above, the bowl holder frame 20 may be formed with the through-hole 22 to which the bowl is mounted in a state where the bowl is inserted thereto. Instead, a configuration may be used such that an area corresponding to the through-hole 22 is formed as a groove having a predetermined diameter to allow the lower surface of the bowl to be mounted. The above example is advantageous in that a size of the bowl may vary since the size of the bowl may be selected depending on a type and a size of the pet.

In addition, an adhesive portion 32 may be provided on an upper surface of the rear support frame 30, and an adjusting portion 21 may be formed at an opposite edge of the bowl holder frame 20 connected to the upper end edge of the front support frame 10. The adjusting portion 21 may extend from the bowl holder frame 20, and may be formed upward to have a predetermined width.

A hook-and-loop fastener (Velcro) scheme may be applied to the adjusting portion 21 and the adhesive portion 32, in which the adjusting portion 21 may be formed as a hook area constituting the Velcro, and the adhesive portion 32 constituting the Velcro may be formed of loops to which the hook area is attached. In other words, the adjusting portion 21 is attached to the adhesive portion 32 provided on the upper surface of the rear support frame 30 so that a position thereof may be fixed.

As described above, when the pet bowl assistance bag is opened, the rear support frame 30 and the front support frame 10 may be opened by a predetermined distance to each other, and the bowl holder frame 20 coupled to the upper edge of the front support frame 10 may be attached and fixed to the upper area of the rear support frame 30. In addition, the bowl may be mounted in the inner area of the bowl holder frame 20.

When the bowl containing water and feed is mounted to the bowl holder frame 20, a predetermined load is applied downward, so a high strength material may be used for the rear support frame 30 and the front support frame 10 to compensate for warpage caused by the load. In the embodiment, thermoplastic resin is used, and ABS resin may be used to minimize the warpage of the rear support frame 30 and the front support frame 10 due to weight of the bowl holder frame 20.

Figure 3:
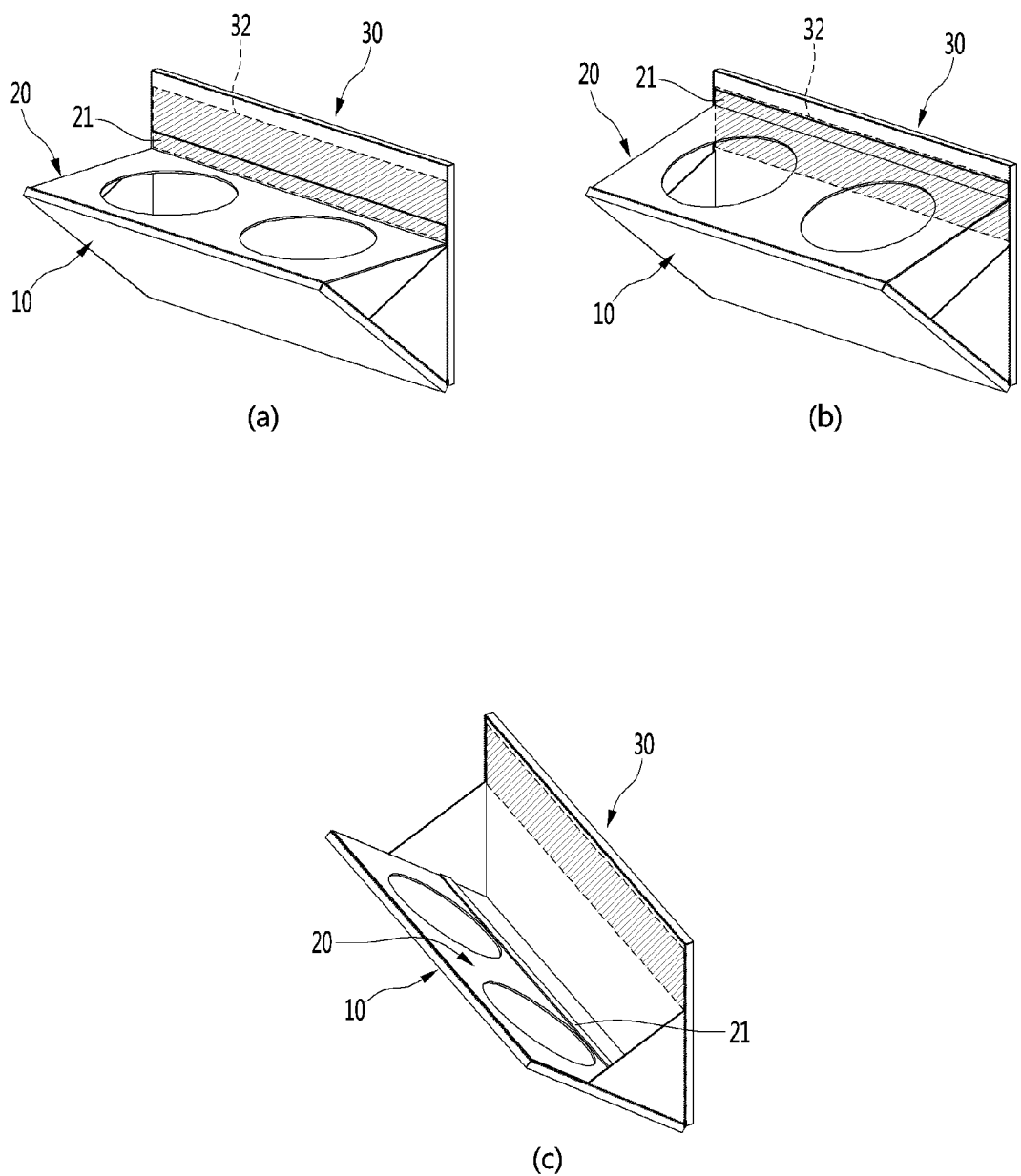
FIG. 3 is a perspective view showing an example of using the pet bowl assistance bag according to the embodiment of the present invention.

FIG. 3 is a perspective view showing an example of using the pet bowl assistance bag according to the embodiment of the present invention. FIGS. 3(a) and 3(b) are perspective views showing a configuration of adjusting a height of the bowl holder frame 20 in a state of opening the pet bowl assistance bag to reveal an inside thereof.

The bowl assistance bag according to the embodiment is provided with the bowl holder frame 20 extending from the upper edge of the front support frame 10, in which the adjusting portion 21 having a predetermined width may be formed at the opposite edge of the bowl holder frame 20.

When the bowl mounted inside the bowl holder frame 20 is required to be horizontally mounted, the adjusting portion 21 may be attached to the adhesive portion 32 by adjusting the position of the adjusting portion 21 as shown in FIG. 3(a), so that an angle of the bowl holder frame 20 may be horizontally fixed.

In addition, as shown in FIG. 3(b), when the position of the adjusting portion 21 is adjusted and attached to the adhesive portion 32, the bowl holder frame 20 may be raised upward and fixed by a predetermined angle based on the upper edge of the front support frame 10.

In other words, according to the embodiment, the fixed angle of the bowl may be changed by adjusting the attached position of the adjusting portion 21. Thus, according to the embodiment, options can be provided to enable a pet to conveniently eat the food and water contained in the bowl. For example, at an initial timing of supplying the pet with the food and water, the position of the adjusting portion 21 is adjusted such that the bowl holder frame 20 is horizontal. After the pet eats some food and water, the position of the adjusting portion 21 may be adjusted such that the bowl holder frame 20 has a predetermined angle, the pet can be fed more easily. Thus, the feeding action may be conveniently performed from a viewpoint of the pet. Further, from a viewpoint of the owner, because an amount of feed that escapes to the outside is reduced due to the convenience of the feeding action of the pet, additional effects of reducing the inconvenience of cleaning up surroundings can also be achieved.

Figure 4:
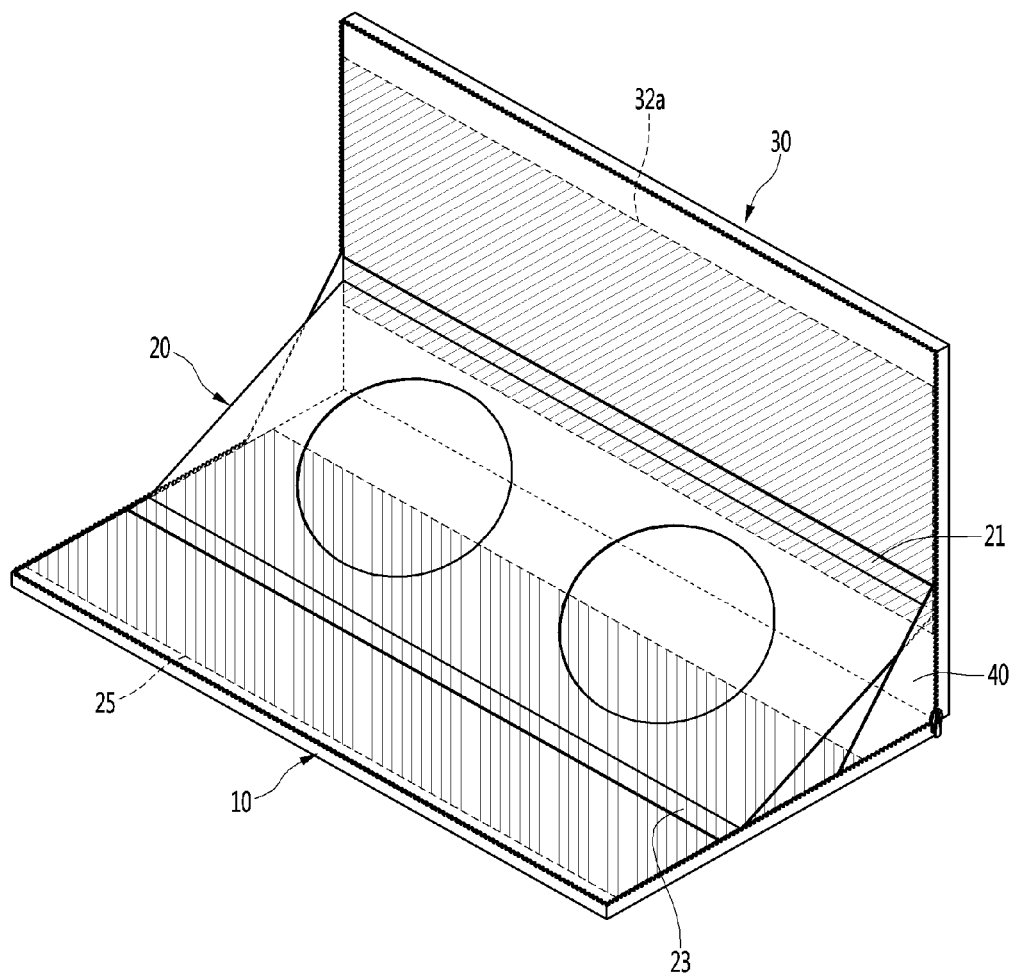
FIG. 4 is a perspective view showing an example of using a pet bowl assistance bag according to another embodiment of the present invention.

FIG. 3(c) is a perspective view showing an inner appearance of the pet bowl assistance bag when the pet bowl assistance bag is not used. As shown in FIG. 3(c), the bowl holder frame 20 extending from the upper edge of the front support frame 10 may be positioned to come into contact with an inner surface of the front support frame 10. In the above state, a periphery between the front support frame 10 and the rear support frame 30 may be sealed through the zipper. In other words, according to the embodiment, the bowl can be fixed through a frame attached to the inside of the bag without preparing for a separate bowl holder, thereby reducing the possibility of missing and increasing the portability. FIG. 4 is a perspective view showing an example of using the pet bowl assistance bag according to another embodiment of the present invention. Referring to FIG. 4, another embodiment of the present invention has the same structure as the bowl assistance bag disclosed in FIG. 1. However, there is a difference in that the inner area of the front support frame 10 has a front adhesive portion 25 having a predetermined width, and a rear adhesive portion 32a provided inside the rear support frame 30 may extend to a point close to the lower end of the rear support frame 30.

In addition, a first adjusting portion 23 having a predetermined width may be formed at one edge of the bowl holder frame 20, and a second adjusting portion 21 having a predetermined width may be formed at an opposite edge.

Hook-and-loop fasteners may be formed on rear surfaces of the first adjusting portion 23 and the second adjusting portion 21, respectively, and either the front adhesive portion 25 or the rear adhesive portion 32a may be attached thereto. Specifically, the first adjusting portion 23 may be attached to any area of the front adhesive portion 25, and the second adjusting portion 21 may be attached to any area of the rear adhesive portion 32a.

The pet bowl assistance bag according to another embodiment of the present invention is configured to vary the position of the bowl holder frame 20 attached to the front support frame 10, so that an overall height of the bowl holder frame 20 can be adjusted. In addition, when the first adjusting portion 23 is attached closely to the lower end of the front support frame 10, the attached position of the second adjusting portion 32a is adjusted, so that the angle of the bowl holder frame 20 may be changed much greater than the structure disclosed in FIG. 1.

The pet bowl assistance bag according to another embodiment of the present invention is configured to allow the height of the bowl to reach the ground, so that the pet can be fed even when a size of the pet is small. The pet bowl assistance bag of the present invention includes a frame for fixing the bowl therein, and the rear support frame 30 may be maintained in a vertical state so as to fix the bowl.

Figure 5:
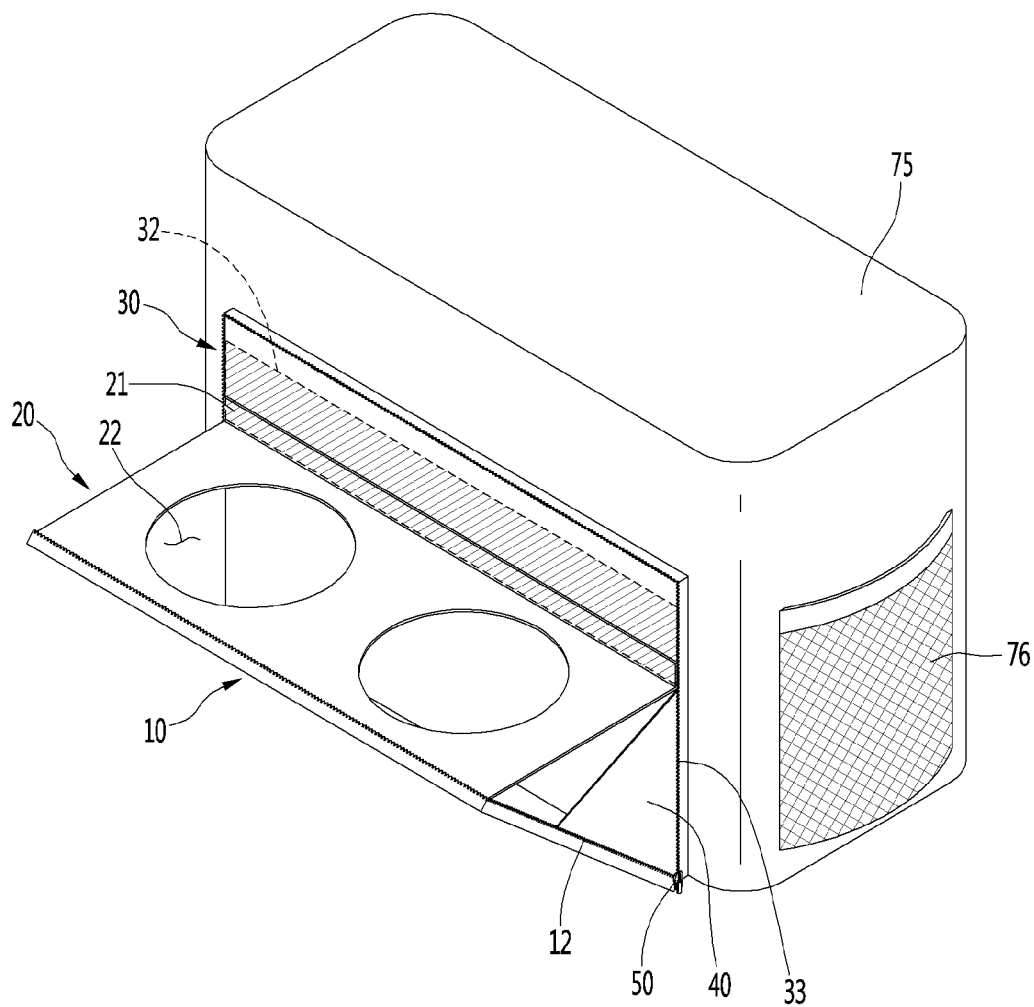
FIG. 5 is a perspective view showing an example of fixing the pet bowl assistance bag according to embodiment of the present invention.

FIG. 5 is a perspective view showing an example of fixing the pet bowl assistance bag according to the embodiment of the present invention. The pet bowl assistance bag of the present embodiment may be used in a form coupled to a side portion of a conventional bag such as a pet supplies bag or a pet carrier. Although not particularly limited, the pet bowl assistance bag may be coupled to the bag having at least one side portion perpendicular to the ground when placed on the ground.

As shown in FIG. 5, the pet bowl assistance bag of the present invention may be coupled to a pet supplies bag 75 having a predetermined space inside thereof and provided with a predetermined storage pocket 76 outside thereof. When the pet supplies bag 75 is not provided with a functional member at the side portion, the pet bowl assistance bag of the present invention may be attached firmly through sewing, or a detachable coupling scheme may be used.

To this end, a strap or hook member may be provided at both edges of the rear support frame 30 so as to be bound with the pet supplies bag 75. The binding scheme is not particularly limited, and any binding scheme may be used as long as the rear support frame 30 is vertically arranged.

As shown in the drawings, the pet bowl assistance bag of the present invention can be opened and closed as needed while being coupled to the side portion of the pet supplies bag 75, and can be stably supported due to the weight of the pet supplies bag 75 even when the bowl is mounted inside the pet bowl assistance bag of the present invention, and the feeding the pet can be stably performed. In addition, the pet bowl assistance bag according to the embodiment may be used as an independently portable pouch, and at this time, an auxiliary device is required for standing upright the rear support frame 30.

Figure 6:
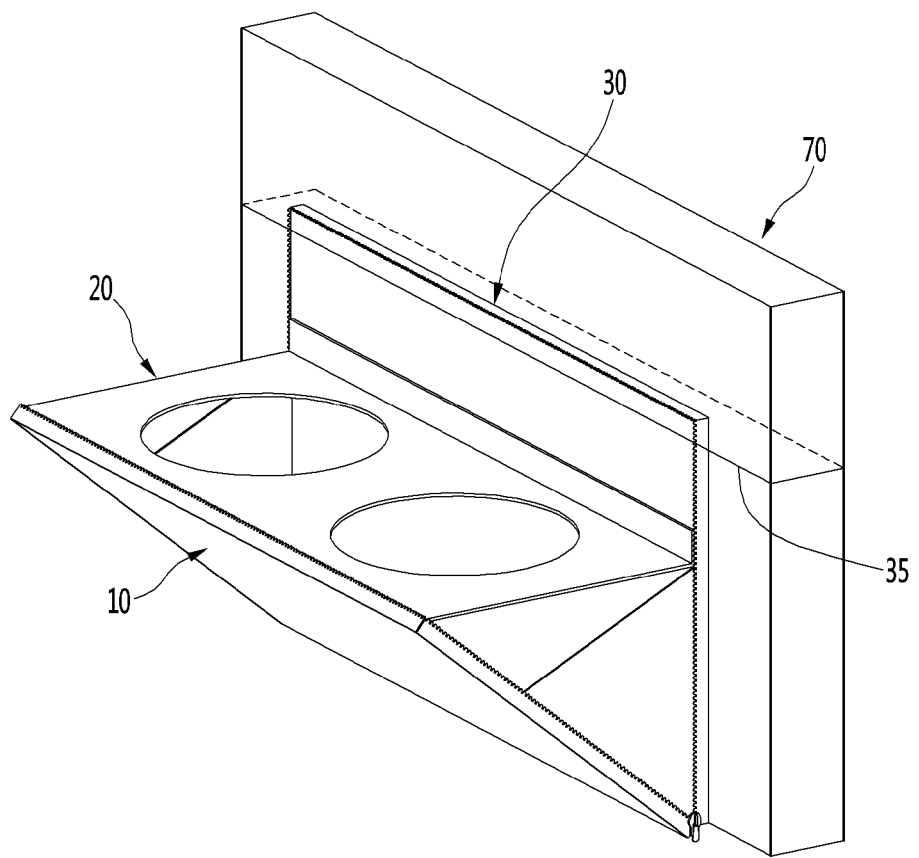
FIG. 6 is a perspective view showing another example of fixing the pet animal bowl auxiliary bag according to the embodiment of the present invention.

FIG. 6 is a perspective view showing an example of fixing the pet bowl assistance bag according to the embodiment of the present invention when used independently.

Referring to FIG. 6, a fixing strap 35, which comes into contact with the upper surface of the rear support frame 30 and is fixed to surround the pillar, may be additionally provided to fix the pet bowl assistance bag according to the embodiment to a structure such as a pillar 70. The fixing strap 35 serves as a member for allowing the rear support frame 30 to come into contact with a side surface of the pillar 70 and be fixed thereto. The fixing strap may be small in volume to be conveniently stored inside the pet bowl bag, and may be taken out in use when the pet is required to be fed.

Figure 7:
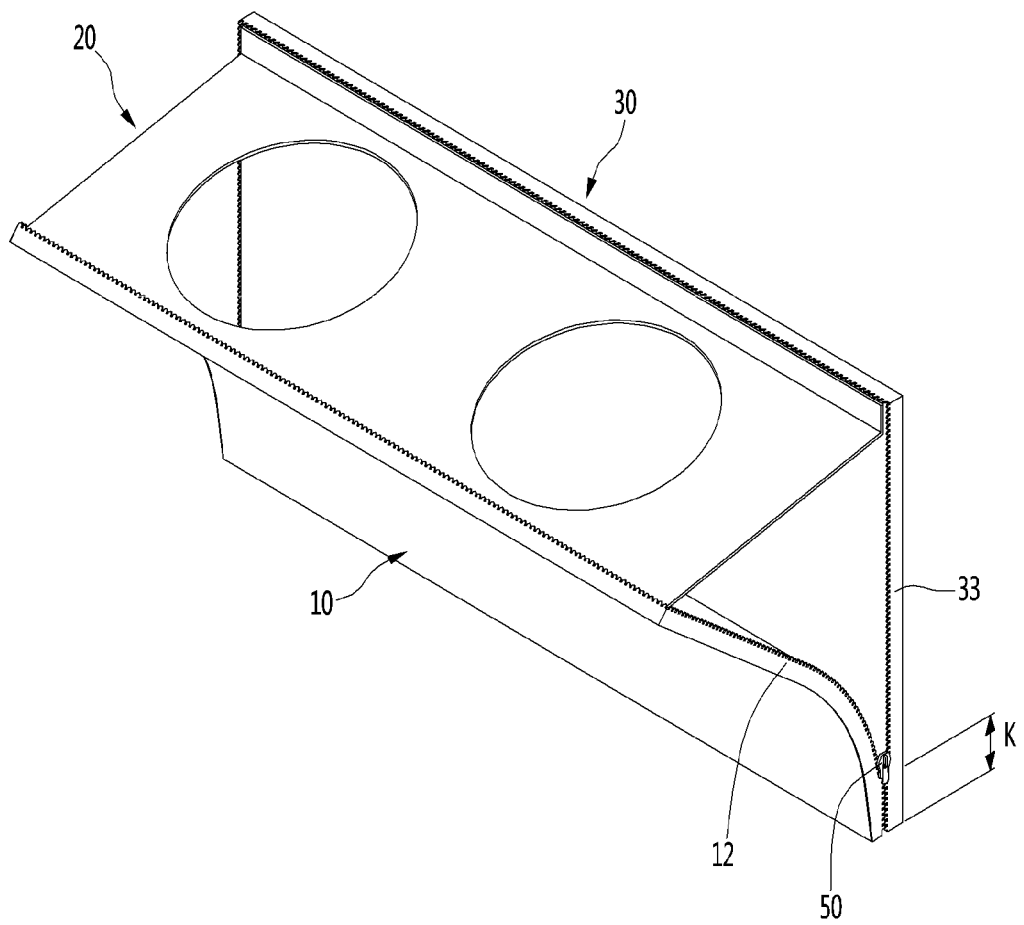
FIG. 7 is a perspective view showing the pet bowl assistance bag according to another embodiment of the present invention.

FIG. 7 is a perspective view showing the pet bowl assistance bag according to another embodiment of the present invention. Referring to FIG. 7, the pet bowl assistance bag according to another embodiment of the present invention includes all of the configurations of the pet bowl assistance bag shown in FIG. 1, but there is a difference in a coupling scheme between the front support frame 10 and the rear support frame 30. The front support frame 10 and the rear support frame 30 are provided with teeth 12 and 33 on both side edges and the upper edge and opened and closed by the zipper 50, however, a coupling point of the zipper 50 is different.

Specifically, lowermost edges of both sides of the front support frame 10 and the rear support frame 30 may be coupled and fixed to each other by a predetermined height K, and the zipper 50 may be coupled to a point corresponding to the predetermined height K. According to the pet bowl assistance bag configured in the above manner, since the predetermined area between the lower ends of the front support frame 10 and the rear support frame 30 is fixed, the front support frame 10 may compensate for a bending force due to the weight of the bowl.

In addition, as shown in FIG. 1, the end of the bowl holder frame 20 is configured to be attached to any point of the adhesive portion provided on the upper surface of the rear support frame 30, so that the angle of the bowl holder frame 20 can be adjusted, and the pet can be fed more easily.

What is claimed is:

1. A pet bowl assistance bag comprising:
   a rear support frame formed in a rectangular shape having a predetermined size;
   a front support frame extending from a lower portion of the rear support frame and having a size corresponding to the rear support frame;
   a folding portion coupled to both side portions of the front support frame and the rear support frame, and folded such that the front support frame is separated from the rear support frame by a predetermined distance; and
   a bowl holder frame having one end coupled to an upper portion of the front support frame and an opposite end attached to an upper inner surface of the rear support frame, and formed therein with a through-hole into which the bowl is inserted, wherein
   the bowl support frame is attached to a predetermined place on the upper inner surface of the rear support frame, so that an angle of the bowl holder frame is adjusted.

2. The pet bowl assistance bag of claim 1, wherein an adjusting portion extending from the bowl holder frame and arranged upward with a predetermined width is formed at an opposite edge of the bowl holder frame connected to the upper end edge of the front support frame, and an adhesive portion having a predetermined width is formed on an upper surface inside the rear support frame, wherein
   a slide fastener is provided between the rear support frame and the front support frame, and the slide fastener opens or closes the front support frame with respect to the rear support frame while moving along side edges and upper edges of the rear support frame and the front support frame, and wherein, when the front support frame and the rear support frame are open, the adjusting portion provided at an end of the bowl holder frame connected to the front support frame is attached to a part of the adhesive portion in a state where the rear support frame is vertically fixed to a ground, so that an angle of the bowl holder frame is determined.

3. The pet bowl assistance bag of claim 1, wherein the front support frame is formed in an inner area thereof with a front adhesive portion having a predetermined width, a first adjusting portion having a predetermined width is formed at one edge of the bowl holder frame connected to the front support frame, and a second adjusting portion having a predetermined width is formed at an opposite edge of the first adjusting portion, and wherein a height of the bowl holder is determined according to a point where the first adjusting portion is attached to an inside of the front support frame.

\* \* \* \* \*